(12) United States Patent
Chu et al.

(10) Patent No.: US 6,791,296 B1
(45) Date of Patent: Sep. 14, 2004

(54) CELL PHONE CHARGING CIRCUIT OF USB INTERFACE

(75) Inventors: Hui-Min Chu, Taipei (TW); Tao-Hung Liu, Taipei (TW)

(73) Assignee: Golden Bridge Electech Inc., Taipei (TW)

(*) Notice: Subject to any disclaimer, the term of this patent is extended or adjusted under 35 U.S.C. 154(b) by 0 days.

(21) Appl. No.: 10/677,337

(22) Filed: Oct. 3, 2003

(51) Int. Cl.[7] .............................................. H01M 10/46
(52) U.S. Cl. ....................................................... 320/114
(58) Field of Search ................................ 320/112, 113, 320/114, 115

(56) References Cited

U.S. PATENT DOCUMENTS 5,425,089 A * 6/1995 Chan et al. ................. 379/183
6,573,768 B2 * 6/2003 Hwang ........................ 327/143

* cited by examiner

Primary Examiner—Edward H. Tso

(57) ABSTRACT

A cell phone charging circuit of a USB interface. The charging circuit is supplied with a DC power of 5V via the USB interface and split into two, one has a first resister R1 connected to an emitter of a PNP transistor Q1 in series, and the other has two serially connected diodes D1 and D2. The diodes D1 and D2 have a negative thermal coefficient. The negative electrode of the diode D1 is connected to the base of the transistor, the collector of the transistor serves as a charging output terminal, such that the emitter voltage $V_{EB}$ of the transistor Q1 is the same as the voltage $V_{D2}$ of the diode D2. Therefore, the current flowing through the resistor is $V_{D1}/R1$, and the voltage and current limiting function is obtained. When the temperature of the battery increases for charging, the voltage $V_{D1}$ is reduced to decrease the output current, such that temperature compensation is achieved. When the output current decreases as the battery voltage increases, the output voltage is increased as the emitter voltage $V_{EC}$ of the transistor Q1 is reduced. The automatic voltage adjustment is implemented.

4 Claims, 2 Drawing Sheets

CELL PHONE CHARGING CIRCUIT OF USB INTERFACE

BACKGROUND OF THE INVENTION

The present invention relates to cell phone charging circuit of a USB interface and, more particularly, to a cell phone charging circuit which uses a power source from a USB interface and has the functions of limiting current, compensating temperature and automatically adjusting voltage.

The universal serial bus (USB) has become an inevitable interface in personal computer, including desktop computer, notebook computer, flat-panel computer, and palm computer. Even the Macintosh computer system adapts the USB as the standard interface. The USB provides a tree-like connection to various types of external devices. It does not only provide high-speed data transmission, but also provides a 5V DC power source to the external devices when the computer is either on or off.

Due to the continuous enhancement of performance, the portable computer (including notebook computer, flat-panel computer or palm computer) has gradually dominated over the desktop computer in the market. Meanwhile, cell phones also become so common that each person possess one or more than one cell phones. The portable computer can log on intenet via the cell phone. The space limitation is relieved, and the user can surf the internet everywhere. However, as the cell phones have a very small dimension; and consequently, the battery power is very limited. If the cell phones can be charged through the USB interface, the application can be broadened and become more popular.

The typical cell phone battery includes Ni_MH, L-ion or Li-polymer batteries. The voltage rating for these batteries is 3.6V. The power supplied by a USB interface is normally 5V. Therefore, a voltage drop is required for applying the USB interface to the cell phone. There are three conventional types of cell phone chargers. The first is the pulse type, which uses software or hardware to convert the output voltage and current into high-frequency pulses, such that the battery is intermittently charged. This is the best type charging method. The performance and lifetime of the battery are optimized by this method. However, the cost of the pulse type is very high. The second type is the linear type (continuous type). That is, a DC current with limited voltage and current is used for charging the battery, such that the battery is protected from being over charged. As the voltage of the battery is increased, the output voltage increases automatically. The performance is superior to the first type, however, this type is more economic. The third type is the simple type, which uses a diode for voltage drop and rectification. Some charger even removes the diode, such that the voltage limiting, current limiting and temperature compensating functions are not provided. This type of charger shortens the lifetime of the battery.

SUMMARY OF THE INVENTION

The present invention provides a cell phone charger of a USB interface, which uses the simplest circuit devices and structure to achieve voltage limiting, current limiting, temperature compensating and automatic voltage adjusting functions of a linear charger.

The cell phone charger includes a PNP transistor, two diodes with negative temperature coefficient, a current limiting resistor, a biased resistor and a filter capacitor. The emitter of the transistor is serially connected to the current limiting resistor, such that two parallel paths are formed by the current limiting resistor and the emitter and base of the transistor and the diodes. Thereby, the voltage between the emitter and the base of the transistor is the same as the voltage of one of the diode; and consequently, the voltage of the current limiting resistor is the same as the voltage of the diode. The current limiting function is thus implemented. When the temperature of the battery increases by charging, the negative thermal coefficient of the diodes reduces the voltage thereof. Therefore, the output current is decreased to provide the temperature compensation. When the output current of the battery decreases as the voltage of the battery increases, the output voltage is increased as the voltage between the emitter and collector of the transistor drops. The automatic voltage adjustment is achieved.

BRIEF DESCRIPTION OF THE DRAWINGS

These, as well as other features of the present invention, will become apparent upon reference to the drawings wherein.

DETAILED DESCRIPTION OF THE INVENTION

Figure 1:
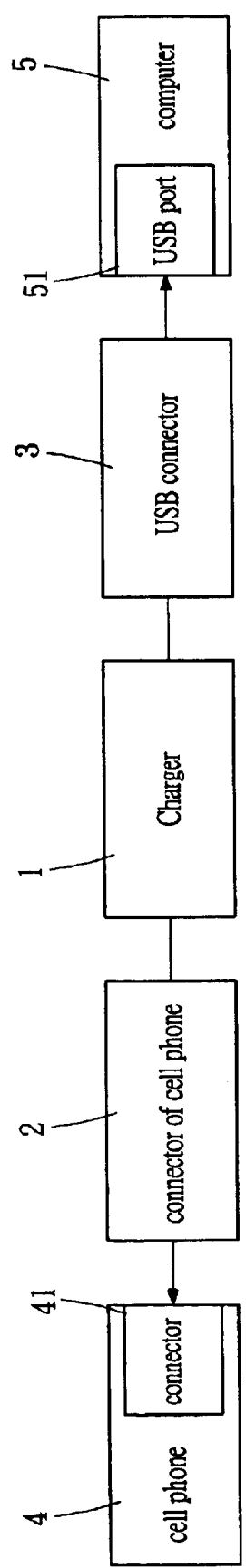
FIG. 1 shows a block diagram of a cell phone charger of a USB interface.
Figure 2:
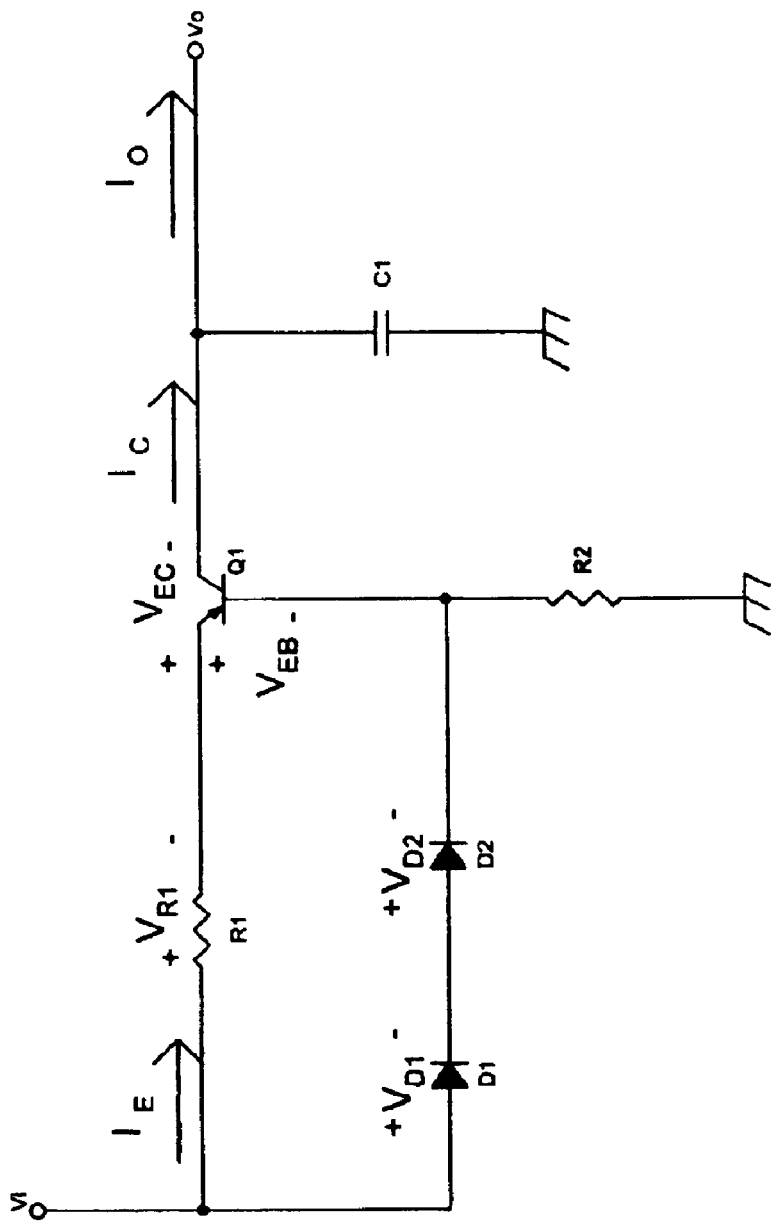
FIG. 2 shows a circuit diagram of the cell phone charger.

Referring to FIG. 1, a block diagram of a cell phone charger of a USB interface is shown. As shown, the charger 1 includes two connectors 2, 3, while the connector 3 is a USB connector 3 to plug in a USB port 51 of a computer 5, and the connector 2 is a cell phone connector for plugging in a connector 41 of a cell phone 4. Thereby, a 5V DC source is supplied from the USB port 51 and output to the cell phone 4. FIG. 2 shows the circuit diagram of the cell phone charger. As shown, the input voltage Vi is a 5V DC voltage source supplied from the USP port 51. The input voltage Vi is split into two paths. One path includes a first resistor R1 serially connected to an emitter of a PNP bipolar junction transistor Q1, and the other path includes two diodes D1 and D2 connected in series. The diodes D1 and D2 have negative temperature coefficient. The positive electrode of the diode D1 is connected to the input voltage Vi, while the negative electrode of the diode D2 is connected to the base of the transistor Q1. The collector of the transistor Q1 is the output voltage Vo terminal for charging. The output voltage terminal Vo is connected to a filter capacitor C1 for filtering ripple. The base of the transistor Q1 provides a bias to the transistor Q1 by a grounded resistor R2. Thereby, a common base topology is constructed by saturation. Because the diodes D1 and D2 are forward biased, a potential difference $V_{EB}$ between the emitter and the base (E-B) of the transistor is established similar to that caused by a forward biased diode. The boltage $V_{EB}$ is about the same as the voltage $V_{D2}$ of the diode D2 (about 0.7V). Therefore, the voltage $V_{R1}$ across the first resistor R1 is about the same as the voltage $V_{D1}$ of the diode D1 ($V_{D1}=V_{D2}\approx0.7V$). Thus, the current flowing through the first resistor R1 is $V_{D1}/R1$. Such current is the emitter current $I_E$ of the transistor Q1. A majority part of the emitter current $I_E$ flows to the collector as collector current $I_C$, while a small amount of the emitter current $I_E$ flows to the base as the base current $I_B$. That is, $I_C=\alpha I_E$, and $\alpha\approx1$. The collector current $I_C$ is the output current $I_O$. As the forward biased diode is very stable, the output current $I_O$ is stabilized, and a current limiting effect is obtained. Further, the output voltage $V_O$ is the input voltage Vi subtracted by the voltage $V_{R1}$ of the first resistor R1 and the emitter voltage $V_{EC}$ of the transistor Q1, so that a voltage limiting effect is resulted.

When the temperature of the battery is raises during charging operation, the negative coefficient of the diode D1 cause the voltage $V_{D1}$, to drop due to the temperature rise. Meanwhile, the voltage across the first resistor R1 is increased as the resistor R1 has positive thermal coefficient. The emitter current $I_E$ and the output current $I_O$ are thus reduced (since $I_E=V_{D1}/R1$). The temperature compensation is thus generated. When the output current $I_O$ decreases as the voltage of the battery increases, the emitter voltage $V_{EC}$ of the transistor Q1 decreases, such that the output voltage $V_O$ is increased as the emitter voltage $V_{EC}$ decreases. An automatic voltage adjustment is obtained.

According to the above, the present invention uses a simple circuit structure to provide the voltage limiting, current limiting, temperature compensating and automatic voltage adjusting functions.

This disclosure provides exemplary embodiments of the present invention. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A cell phone charger of a USB interface, wherein the USB interface supplies a 5V DC voltage to the charging circuit as an input voltage, and the input voltage is split into two paths, one of the paths includes a first resistor with one end serially connected to an emitter of a PNP transistor and the other end connected to the input voltage, and the other of the paths includes a first diode and a second diode serially connected together, the first diode includes a positive electrode connected to the input voltage, the second diode includes a negative electrode connected to a base of the transistor, and a collector of the transistor serves as a output voltage terminal, the base of the transistor forms a common base topology by connecting a grounded second resistor.

2. The cell phone charger according to claim 1, wherein the transistor comprises a bipolar transistor.

3. The cell phone charger according to claim 1, wherein the output voltage terminal is connected to a filter capacitor.

4. The cell phone charger according to claim 1, wherein the transistor is biased to saturation.

* * * * *